Feb. 5, 1952    C. R. ALDEN    2,584,654
HEATER FOR MOVING ELECTROLYTES
Filed Oct. 11, 1949
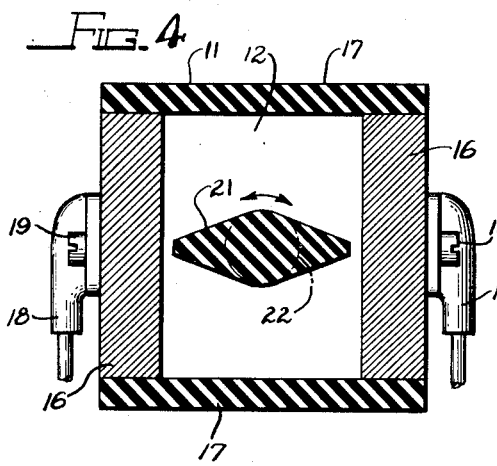
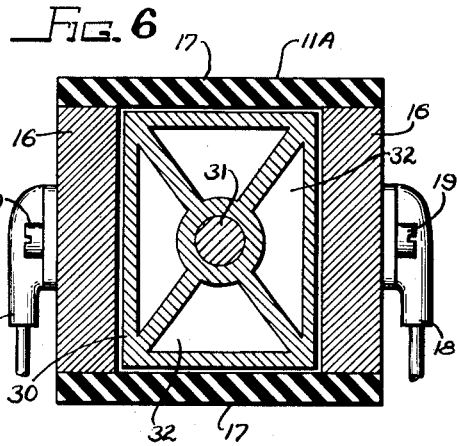
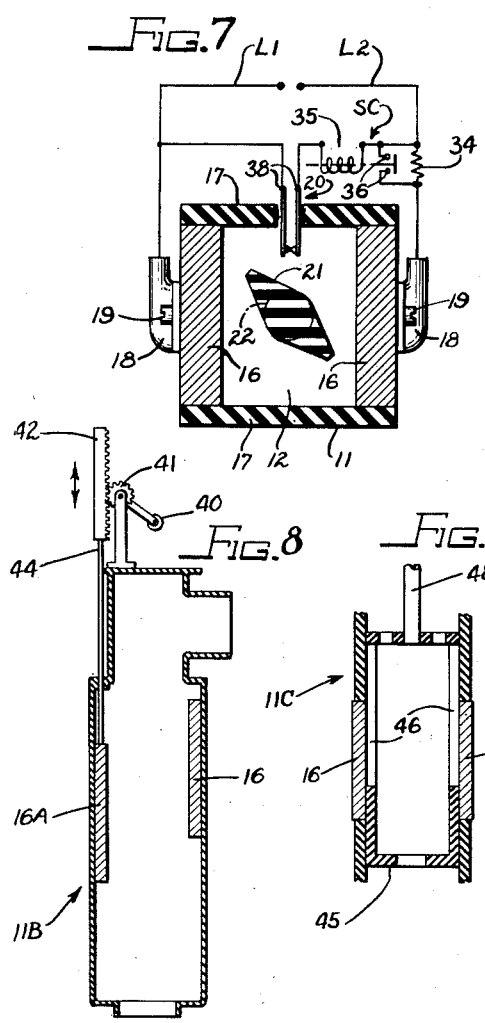
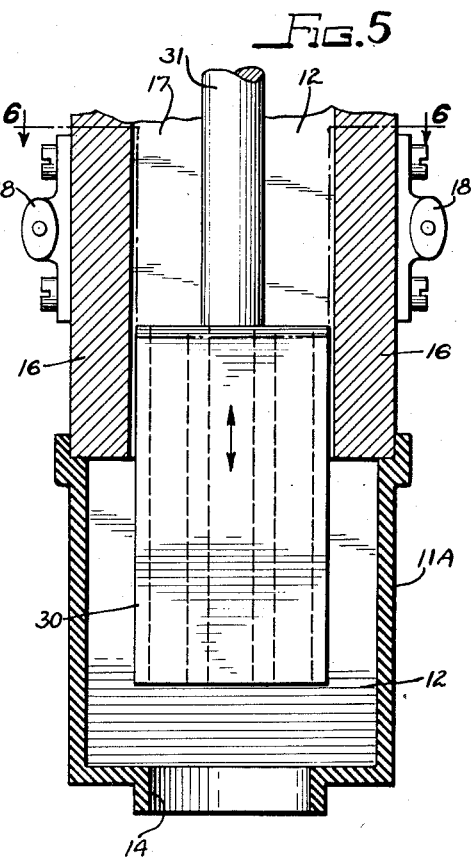
INVENTOR.
Carroll R. Alden Patented Feb. 5, 1952

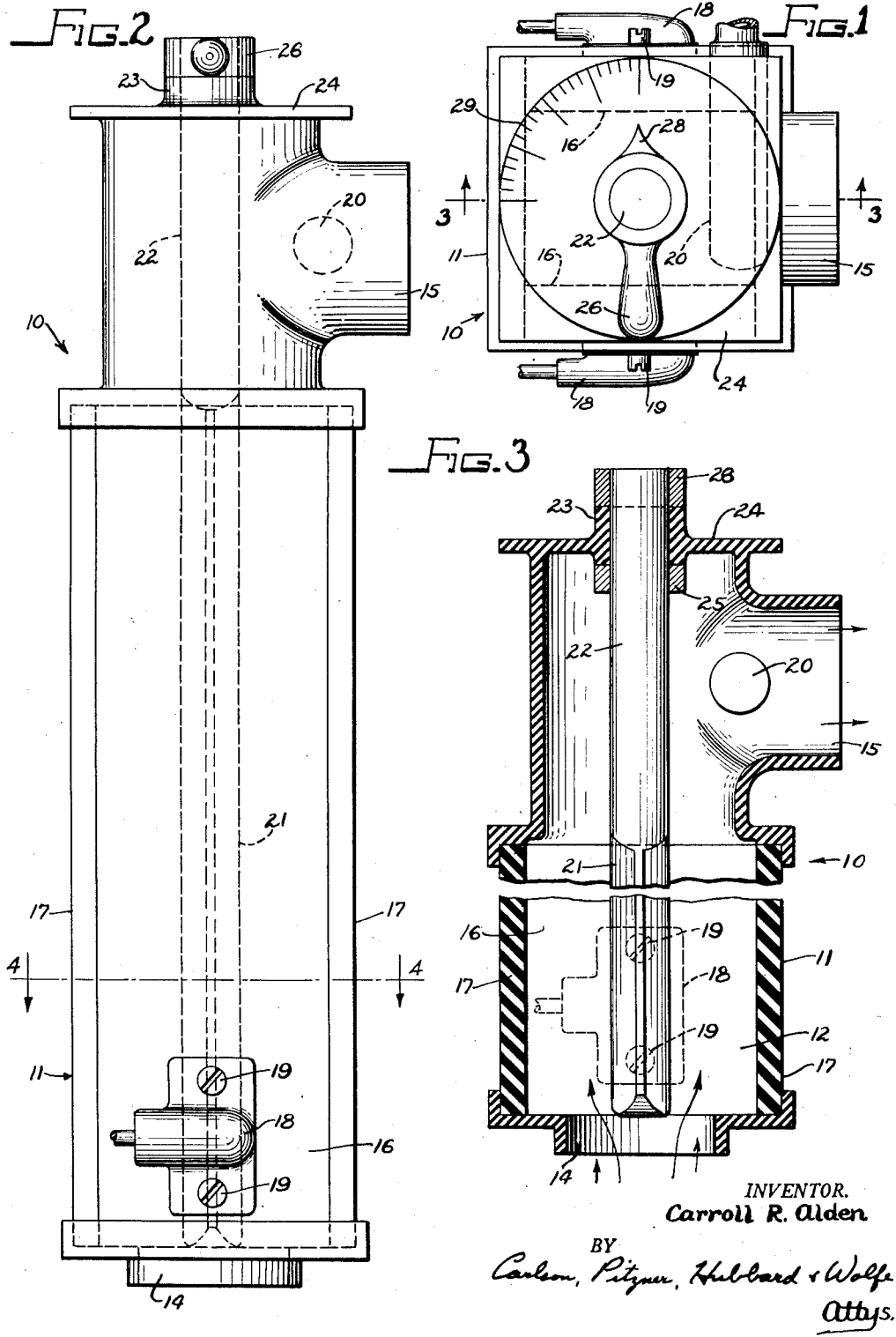

2,584,654

UNITED STATES PATENT OFFICE 2,584,654

HEATER FOR MOVING ELECTROLYTES

Carroll R. Alden, Detroit, Mich., assignor to Ex-Cell-O Corporation, Detroit, Mich., a corporation of Michigan Application October 11, 1949, Serial No. 120,727

10 Claims. (Cl. 219—40)

The present invention relates generally to means for applying heat to a moving fluid and more specifically to a device of this nature for raising the temperature of a moving electrolyte to a relatively constant level through the application of heat at a controlled rate. The invention finds particular but not exclusive utility in the continuous-flow pasteurization of milk.

A general object of the present invention is to provide a novel heating device of the type set forth and adapted to maintain the temperature of the electrolyte within relatively close limits notwithstanding variations in flow as well as in the initial temperature and composition of the incoming fluid.

A more specific object is to provide a continuous-flow pasteurizer for liquids such as milk and which will be both economical in construction and susceptible of reliable operation over a long period of time.

Another object is to provide a pasteurizer of the foregoing character which will be simple to operate and easy to maintain in a sanitary condition.

A further object is to provide a device of the above type adapted for stable operation with liquids having a negative temperature coefficient of specific resistance.

Other objects and advantages will become apparent as the following detailed description proceeds, taken in connection with the accompanying drawings, wherein:

Figure 1 is a plan view of a simple illustrative heating device embodying the present invention.

Fig. 2 is a front elevation of the device of Fig. 1.

Fig. 3 is a vertical sectional view through the device of Fig. 1 and taken in the plane of the line 3—3.

Fig. 4 is a transverse sectional view taken horizontally through the device of Fig. 1 and in the plane of the line 4—4 in Fig. 2.

Fig. 5 is a fragmentary vertical sectional view through a device similar to that of Fig. 1 but having certain modifications in its structure.

Fig. 6 is a transverse sectional view taken horizontally through the modified device of Fig. 5 and in the plane of the line 6—6.

Fig. 7 is a schematic diagram of a simple electrical control circuit embodying a phase of the present invention.

Figs. 8 and 9 are diagrammatic views of modified heating devices also embodying the present invention.

While the invention is susceptible of various modifications and alternative constructions, a preferred embodiment has been shown in the drawings and will be described below in considerable detail. It should be understood, however, that there is no intention to limit the invention to the specific form disclosed, but on the contrary, the intention is to cover all modifications and alternative constructions falling within the spirit and scope of the invention as expressed in the appended claims.

Referring more specifically to the drawings, the invention is there shown embodied in an illustrative heating device 10 which in the present instance happens to be a continuous-flow electrical pasteurizer for milk. The pasteurizer 10 comprises a hollow body 11 having walls defining therein a fluid passage or heating chamber 12 running longitudinally of the body. At its lower end, the body 11 is provided with a fluid inlet 14 and at its upper end with a fluid outlet 15, both the inlet and the outlet communicating with the chamber 12. The inlet 14 and outlet 15 may, of course, be connected in any well-known manner to external conduits which channel a flow of electrolytic fluid through the chamber 12 for processing. Heat energy is supplied to the fluid passing through the chamber 12 by means of a pair of opposed electrodes 16 separated by insulators in the form of opposed side walls 17 of the body 11. The electrodes 16 may conveniently be energized from a source of single-phase alternating current through electrical connectors 18 fixed to the electrodes as at 19. Although the invention is equally well adapted for use with heating devices energized from multi-phase sources, the device 10 has been shown in single-phase form for purposes of simplicity in illustration. In the vicinity of the outlet 15, there is mounted a temperature responsive device 20 which extends transversely of the outlet.

It will be readily appreciated that a continuous-flow heater such as the pasteurizer 10 must be capable of supplying heat at varying rates to the liquid flowing therethrough if the temperature of the outgoing liquid is to be held within the close tolerances required for satisfactory pasteurization. The need for a variable heat rate may be occasioned, for example, by variations in the rate of flow of the liquid or in the temperature of the liquid entering the chamber 12. A varying heat rate may also be necessitated by slight variations in the composition of the milk or other liquid being processed.

Provision is made in the pasteurizer 10 for controlling the rate at which heat is transferred to the fluid passing therethrough by controlling the effective electrical resistance interposed between the electrodes 16. This is accomplished in the present instance by the use of means including a dielectric or nonconductive member selectively positionable to vary the effective resistance of the volume of liquid between the electrodes 16. With this end in view, the pasteurizer 10 is provided with a dielectric or nonconductive shield 21 having an integral supporting stem 22 (Figs. 2 and 3). As indicated in the drawings, the stem 22 is journaled in boss 23 of top panel 24 on the body 11, dependably supporting the shield in the latter. The shield is restrained against displacement axially of the chamber 12 by means of a retaining collar 25 on the underside of the panel 24 and also by means of an adjusting handle 26 outside of the panel 24. Both the collar 25 and the handle 26 are rigidly fixed to the supporting stem 22 and may have an appropriate packing gland or resilient washer (not shown) interposed therebetween. In the foregoing structure, it will be perceived that the effective resistance between the electrodes 16 may be altered by altering the angular position of the shield 21 so as to vary the cross-sectional area of the electrolytic current path between the electrodes. Angular movement of the shield 21 may of course be readily produced by means of the handle 26 which may have an integral pointer 28 and a graduated scale 29 associated therewith (Fig. 1). When positioned as indicated in Fig. 4, the shield 21 creates a minimum of resistance to current flow through the electrolyte in the chamber 12. On the other hand, when rotated 90° from the position of Fig. 4, the shield 21 creates a maximum of resistance to current flow, thereby effectively decreasing the heat input to the fluid in the chamber 12. In order to smooth out the curve of resistance changes for various angular positions of the shield 21, the latter is preferably fashioned with a cross section substantially diamond in shape.

In lieu of the rotatable shield 21 of paddle-like shape, the device 10 may be equipped with a hollow box-like shield 30 having a supporting stem 31 and mounted for sliding movement longitudinally of the chamber 12. The shield 30 has a grid-like cross section only slightly smaller than that of the chamber 12 but which defines longitudinal fluid passages 32 (Figs. 5 and 6), thus permitting a substantial flow of fluid through the chamber 12 in spite of the overall dimensions of the shield. Adjustment of the shield 30 longitudinally of the chamber 12 may be accomplished through the use of any suitable positioning means connected with the end of the stem 31 projecting above the top body panel 24. Thus it will be noted that the effective area of the current path, and hence the effective electrical resistance, of the liquid between the electrodes 16 may be varied simply by varying the vertical position of the shield 30. When substantially the entire faces of the electrodes 16 are exposed, the liquid in the chamber 12 will offer a minimum of resistance to the passage of current therethrough. Conversely, when the box-like shield 30 is elevated to a position entirely within the space between the electrodes, the liquid in the chamber 12 will offer a maximum of resistance. To accommodate the device 10 to the box-like shield 30, the body 11 may have an elongated lower portion 11A of appropriate length to receive the member 30.

In addition to the use of the shield members 21, 30, resort may be had to other equally useful expedients for varying the effective electrical resistance interposed between the electrodes 16. For example, this objective may be accomplished by changing the magnitude of the electrode area which actually comes into contact with the liquid of the chamber 12. Still another expedient would be to change the spacing between the electrodes so as to alter the length of the fluid path between them.

It has been observed that many electrolytes, including milk, have a negative temperature coefficient of specific resistance. When such an electrolyte is being processed in the device 10, any circumstance which results in even a slight reduction in temperature occasions an increase in the effective resistance between the electrodes. Such increase in resistance is reflected in a corresponding reduction of the current flow through the electrolyte, thereby reducing the heat energy input and further decreasing the temperature. Conversely, an increase in the temperature of the electrolyte within the chamber 12 will result in a decrease in resistance of the electrolyte. The decrease will result in a corresponding increase in current flow, increasing the heat energy input and producing a further increase in temperature. In view of the foregoing, it will be appreciated that an operator must pay rather strict attention to the temperature of the outgoing liquid if the structure thus far described is to accomplish satisfactory pasteurization.

In the practice of the invention, provision has been made to compensate for changes in the specific resistance of the electrolyte occasioned by minor variations of temperature. This is accomplished by producing a relatively slight change in the voltage applied to the electrodes 16, such change being of proper magnitude and direction to offset the effect of the resistance changes occasioned by slight temperature variations of the electrolyte in the chamber 12. Moreover, the foregoing is achieved without changing the resistance of the fluid within the chamber 12 or disturbing the position of the movable shield 21 or 30. Referring to Fig. 7, there is shown schematically a pair of supply lines L1, L2 for the electrodes 16 and which may be connected to any suitable source of single-phase alternating current. Series connected into the electrode circuit, and in the present instance connected into the conductor L2, is a resistor 34. To render the resistor 34 effective or ineffective, there is provided a shunting contactor SC. The latter has an actuating coil 35 which, when energized, is adapted to close contacts 36 of a switch which by-passes the resistor 34. The coil 35 is connected across the power supply circuit L1, L2 in series with contacts 38 of temperature responsive device 20. These contacts 38 may be of the bi-metallic type and in the present instance are adapted to close when the temperature of the outgoing liquid is lower than a predetermined value, also being adapted to open when such temperature increases above the predetermined value. With this arrangement, it will be noted that an increase in the temperature of the liquid in the chamber 12 above the predetermined value will cause the contactor SC to become de-energized and thereby create a slight potential drop in the electrode circuit by cutting in the resistor 34. Conversely, a decrease in the temperature of the liquid will close the contacts 38 and energize the contactor SC so as to shunt out the resistor 34 and eliminate the drop in potential which it had previously caused. The magnitude of the resistor 34 is sufficient to compensate for changes in the resistance of the electrolyte resulting from slight variations in its temperature. The value of the resistor 34, in addition, may be of sufficient magnitude to compensate also for changes in the resistance of the electrolyte occasioned by slight changes in initial temperature and volume of liquid entering the chamber 12.

In operation, assuming that the dielectric shield member 21 or 30 has been positioned for that power input which will result in the maintaining of a predetermined temperature, the contacts 38 of the temperature responsive device 20 will open and close with increases and decreases in liquid temperature and thus alter the potential applied to the electrodes 16 by amounts which are just sufficient to compensate for the negative temperature resistance characteristic of the electrolyte. This eliminates what would otherwise be an unstable operating condition and makes frequent shifting of the shield member unnecessary once a state of steady operation has been reached.

In addition to the expedients already described herein for varying the total energy input to the fluid within the heating chamber, Figs. 8 and 9 illustrate schematically two additional modes of accomplishing such result. Turning first to Fig. 8, it will be noted that a pair of electrodes 16, 16A are housed within a modified heater body 11B and are movable relative to one another. In the present instance, the electrode 16 is rigidly fixed to the wall of the body while the electrode 16A is adapted to slide axially thereof to vary the effective electrical resistance between the electrodes. The electrode 16A may conveniently be adjusted by means of an external crank 40 which actuates a pinion and rack 41, 42, the latter being connected to the electrode 16A as by means of a sliding stem 44.

In Fig. 9, a modified body 11C contains a pair of fixed electrodes 16. The total energy input to the fluid passing through the body may be varied selectively by varying the total immersed area of the electrodes 16, thereby altering the electrical resistance interposed therebetween. This may readily be accomplished by the use of a dielectric shield 45 similar to the shield 30 but which telescopes within the body 11C and makes a relatively close fit with the walls thereof. The side walls of the shield 45 overlying the electrodes 16 are formed with relatively large openings 46 which are adapted to expose greater or lesser areas of the electrode faces to the fluid within the body, depending upon the axial position of the shield therein. Axial adjustment of the shield 45 may be effected through the use of appropriate positioning means connected with the end of a stem 48.

I claim as my invention:

1. A heater for raising the temperature of a moving stream of electrolytic fluid to a predetermined value by controlling the energy input thereto, said heater comprising the combination of a hollow body adapted to receive a continuous flow of said fluid therethrough, said body also having a fluid inlet and a fluid outlet, electrodes mounted in spaced apart relation and immersible in said fluid within said body, said electrodes being adapted to pass current through the fluid flowing through said body causing such fluid to become heated due to its own electrical resistance, a nonconductive shield housed within said body and mounted for adjustment relative to said electrodes, said shield being adapted to vary the effective resistance to the flow of current through the fluid between said electrodes to produce relatively large variations in the power input to said fluid, means including a thermal switch member responsive to the temperature of the fluid leaving said body, said member being located adjacent the outlet of said body, and means controllable by said thermal switch member for effecting relatively small variations in the power input to the fluid within said body without altering the position of said adjustable member.

2. A continuous-flow pasteurizer for electrolytic fluids such as milk having a negative temperature coefficient of specific resistance, said pasteurizer comprising the combination of a hollow body having a fluid inlet and a fluid outlet, electrodes mounted in spaced relation and immersible in said fluid within said body, said electrodes being adapted to pass current through the fluid for heating of the same due to its own electrical resistance, a movable dielectric member housed within said body and mounted for adjustment relative to said electrodes, said shield being adapted to produce relatively large variations in the power input to said fluid through variation of the effective resistance to the flow of current between said electrodes, means including a thermal switch member responsive to the temperature of the fluid leaving said body, an electrical resistor, and contactor means controllable by said thermal switch means, said contactor means being adapted to connect said resistor into the circuit of said electrodes to effect a relatively slight drop in the potential applied to said electrodes, said contactor means also being adapted to shunt said resistor out of said circuit to effect a relatively slight increase in the potential applied to said electrodes, said variations being of appropriate magnitude and direction to offset said negative temperature coefficient of the fluid.

3. A heater for raising the temperature of a moving stream of electrolyte to a predetermined value by controlling the energy input thereto, said heater comprising the combination of a hollow body having a passage for the continuous flow of electrolyte therethrough, said body also having an inlet and an outlet in communication with the passage, electrodes mounted in spaced apart relation in the walls of said passage, said electrodes being adapted to pass current through the electrolyte flowing therebetween causing such electrolyte to become heated due to its own electrical resistance, means including an adjustable member adapted to vary the effective resistance to the flow of current through the electrolyte between said electrodes to produce relatively large variations in the power input to the electrolyte, and means including a thermal switch member responsive to the outgoing temperature of the electrolyte, said member being located adjacent the outlet of said body, and means controllable by said temperature responsive means for effecting relatively small variations in the power input to the electrolyte in said passage without altering the position of said adjustable member.

4. A device for raising the temperature of a moving electrolyte to a predetermined value by the application of heat at controlled rates, said device comprising, in combination, a hollow body having a fluid inlet and a fluid outlet both communicating with a heating chamber for the electrolyte, electrodes mounted on said body in spaced relation and adapted to pass current through the electrolyte as the latter flows through said heating chamber, movable means for selectively regulating the power input to the electrolyte in said chamber, said movable means being adjustably positionable to alter the effective resistance to the flow of current between said electrodes, means responsive to the temperature of the electrolyte leaving the heating chamber, and means controllable by said temperature responsive means for effecting relatively slight changes in the flow of current in the circuit including the electrodes without altering the position of said movable means.

5. A device for raising a moving electrolyte to a predetermined temperature through the controlled application of heat thereto, said device comprising the combination of means defining a heating chamber for the electrolyte, electrodes mounted in spaced relation and adapted to pass current through the electrolyte in said chamber, movable means adjustably positionable to alter the effective resistance to the flow of current between said electrodes, means responsive to the temperature of the electrolyte leaving the heating chamber, and means controllable by said temperature responsive means for effecting relatively slight changes in the potential applied to said electrodes without altering the position of said movable means.

6. A device for applying heat to a moving electrolyte at controlled rates and comprising, in combination, a hollow body defining a heating chamber for the electrolyte having a fluid inlet and a fluid outlet both communicating with said heating chamber, longitudinally disposed flat electrodes mounted in laterally spaced and opposed relation on said body and adapted to pass current through the electrolyte as the latter flows through said heating chamber, and a movable dielectric member housed within said chamber and interposed between said electrodes, said dielectric member being mounted for adjustment relative to said electrodes, and means disposed exteriorly of said body and operatively associated with said movable dielectric member to adjustably position the latter to vary the effective longitudinal cross-sectional area of said electrolyte between said electrodes so as to vary the effective resistance to the flow of current between said electrodes.

7. A heating device for raising the temperature of a moving electrolytic fluid to a predetermined value by the application of heat at controlled rates, said device comprising, in combination, a hollow body having a fluid heating chamber communicating with an inlet and an outlet, a pair of longitudinally disposed electrodes mounted on said body and presenting flat surfaces in spaced parallel relation within said chamber adapted to pass current through the fluid as the latter flows through said heating chamber, a dielectric shield of paddle-like form of elongated transverse section housed within said chamber and interposed between said electrode surfaces, a supporting stem fixed to said dielectric shield and defining a central longitudinal axis of rotation thereof, said stem being journaled in a panel of said body, and adjusting means operatively associated with said stem outside said body for varying the angular position of said shield about its axis relative to said electrode surfaces, so as to vary the effective longitudinal cross-sectional area of the electrolyte between said surfaces whereby to alter the effective resistance to the flow of current between said electrodes.

8. A heating device for raising the temperature of a moving electrolytic fluid to a predetermined value by the application of heat at controlled rates, said device comprising, in combination, a hollow body having a fluid heating chamber together with an inlet and an outlet for the same, electrodes mounted in spaced relation on said body and adapted to pass current through the fluid as the latter flows through said heating chamber, a dielectric shield of hollow rectangular box-like form longitudinally slidable within said chamber between said electrodes and having passages therein adapted to permit a flow of the fluid longitudinally of said heating chamber, a supporting stem fixed to said dielectric shield and slidably mounted in a panel of said body, and adjusting means operatively associated with said stem outside said body for selectively interposing said shield to a greater or lesser extent between said electrodes so as to vary the power input to said fluid through variation of the effective resistance to the flow of current between said electrodes.

9. A heating device for increasing the temperature of a moving electrolytic fluid to a predetermined value through the application of heat thereto at a controlled rate, said device comprising, in combination, body means defining a passage for the fluid, electrodes mounted in spaced relation on said body means for immersion in the fluid within said passage, said electrodes being adapted to pass an electric current through the electrolyte for heating of the same by electrical resistance, and means for selectively varying the total immersed area of said electrodes to alter the effective resistance to a flow of current therebetween.

10. A device for raising the temperature of a moving electrolytic fluid at controllable rates comprising, in combination, a pair of rectangular electrodes presenting flat opposed surfaces and adapted to be connected to a suitable source of electric current, a pair of insulating plates spaced apart and interposed between said electrodes and secured thereto to hold said electrode surfaces in spaced parallel relation, said electrodes and plates defining an elongated rectangular heating chamber for said fluid, a dielectric member interposed between said electrodes longitudinally within said chamber, a supporting stem fixed to said dielectric member and projecting beyond said chamber, and manually operative adjusting means connected to said stem exteriorly of said chamber and effective through the latter to alter the position of said dielectric member relative to said electrode surfaces so as to vary the longitudinal cross-sectional area of said fluid between said electrode surfaces whereby to vary the effective resistance to a current flow between said electrodes through said fluid.

CARROLL R. ALDEN.

REFERENCES CITED

The following references are of record in the file of this patent:

UNITED STATES PATENTS

| Number | Name | Date |
|---|---|---|
| 1,730,016 | Rudd | Oct. 1, 1929 |
| 1,967,011 | Pargman | July 17, 1934 |
| 2,100,326 | Getchell | Nov. 30, 1937 |
| 2,100,329 | Getchell | Nov. 30, 1937 |